April 1, 1952     J. T. McCORMIC     2,590,990
FISHING BAIT OR LURE
Filed July 29, 1949
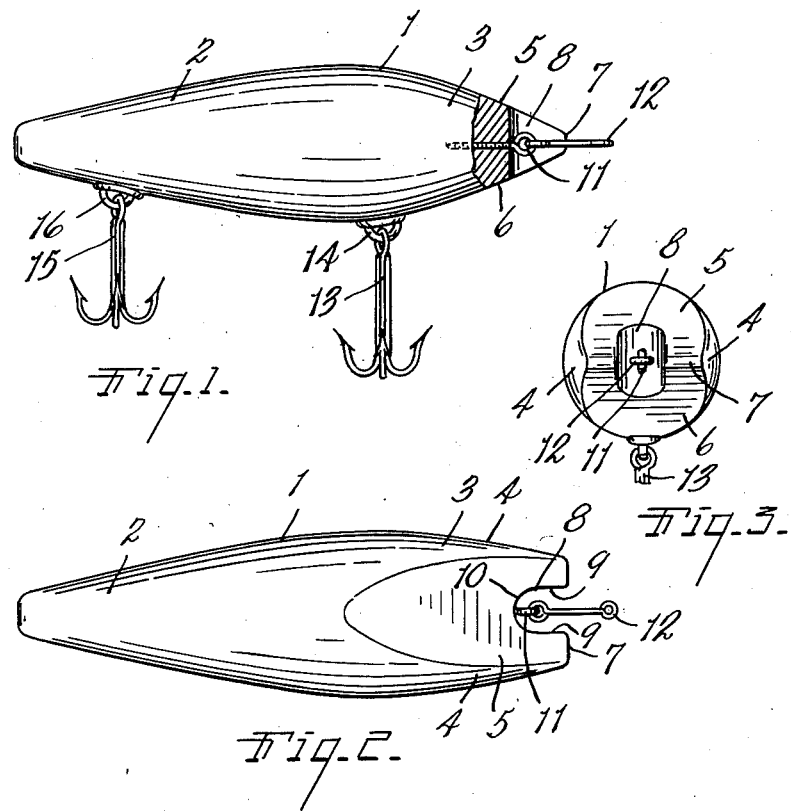
INVENTOR.
John Thomas McCormic
ATTORNEY.

Patented Apr. 1, 1952

2,590,990

UNITED STATES PATENT OFFICE 2,590,990

FISHING BAIT OR LURE

John Thomas McCormic, Indianapolis, Ind.

Application July 29, 1949, Serial No. 107,620

5 Claims. (Cl. 43—42.48)

This invention relates to improvements in fishing bait or lure.

The main objects of this invention are:

First, to provide a fishing bait or lure which when drawn through the water has a movement simulating swimming.

Second, to provide a fishing bait or lure which floats when resting on the water but dives below and remains below the surface while being drawn through the water.

Third, to provide a fishing bait or lure having these advantages which may be very economically produced.

Objects relating to details and economies of the invention will appear from the description to follow. The invention is pointed out in the claims.

A preferred embodiment of the invention is illustrated in the accompanying drawing, in which:

Fig. 1 is a side elevational view of a fishing bait or lure embodying my invention partially in longitudinal section and partially broken away.

Fig. 2 is a plan view thereof.

Fig. 3 is a front elevational view showing one hook partially broken away.

The embodiment of my invention illustrated comprises a body designated generally by the numeral 1 and which may desirably be formed of wood or plastic. The body 1 comprises a rearwardly tapered elongated rear portion 2 of circular section and a forwardly tapered head portion 3 having curved sides 4 merging into the rearwardly tapered portion and transversely flattened top and bottom surfaces 5 and 6. These surfaces 5 and 6 are in this preferred embodiment slightly curved longitudinally. They converge toward the front end of the body to a relatively narrow horizontal nose 7.

The front end of the body is provided with a longitudinally extending recess 8 of substantial width and depth having parallel side walls 9 and curved bottom 10. The line attaching eye 11 is secured centrally in the bottom of this recess and in the longitudinal axis of the body. Desirably a link 12 is secured to the eye 11 and projects beyond the nose so that the body can pivot on the joint of the link and eye as the bait is drawn through the water in spaced relation to the end of the nose. The recessed nose is in effect a double nose one at each side of the longitudinal center of the body.

It will be noted that these transversely flat surfaces are of a length approximating the length of the forwardly tapered head portion and that they bisect the curved side surfaces of the head portion. The forward hook 13 is swingably secured to the under side of the body at 14 desirably at the rear end of the bottom flattened surface. The rear hook 15 is swingably secured at 16 to the under side of the body adjacent to but in spaced relation to the rear end of the body.

When the bait is cast it floats upon the water but when propelled by the line, dives somewhat under the surface of the water and as it is advanced zigzags and swings on the line attaching link with a movement simulating swimming which is very effective in attracting the attention of fish. The bait body is symmetrical and with the hooks attached remains in upright position, the hooks acting as balances and also to cause the bait to dive below the surface. It will be noted that the front hook is attached to the body substantially in advance of the longitudinal center of the body and when the bait is propelled through the water by the line, the resistance of the hook tends to immediately tilt the front end of the body downwardly and this, together with the point of attachment of the line, insures the diving of the bait below the surface and its traveling below the surface of the water. The distance below the surface depends somewhat upon the speed of retrieving the bait. When the bait rests upon the water it assumes a substantially horizontal position. The flattened surfaces 5 and 6 may be colored or finished as desired to render the bait more distinctive and attractive.

I have illustrated and described a highly desirable preferred embodiment of my invention. I contemplate, however, that certain modifications can be made in the shape and proportions without departing from my invention.

Having thus described my invention, what I claim as new and desire to secure by Letters Patent is:

1. A fishing bait or lure comprising a body having an elongated rearwardly tapered portion of circular section, and a forwardly tapered head portion having curved side surfaces merging into the rear portion, and forwardly converging transversely straight longitudinally convexedly outwardly curved top and bottom surfaces bisecting the curved side surfaces of the head portion, the said top and bottom surfaces being of a length approximating the length of the forwardly tapered head portion, the front ends of said top and bottom surfaces being horizontally of substantial width and being vertically spaced providing a horizontally extending nose in the plane of the axial center of the body, said nose having a central recess therein and having parallel sides and a vertically rounded bottom, a line attaching member secured centrally at the bottom of the recess and in substantially the axial center of the body and spaced rearwardly of the end of the nose, said recess being of substantial width and longitudinal depth and height defining a vertical wall to facilitate the flow of a substantial quantity of water vertically therethrough on the opposite sides of a line attached to said attaching member, the portions of the top and bottom converging surfaces on the opposite sides of said recess forwardly of said attaching member extending horizontally a substantial distance from said recess to provide top and bottom surfaces transversely straight and of substantial area at the sides of the recess forwardly of the attaching member, a hook swingably secured to the under side of the body at the rear end of the bottom flattened surface, and a second hook swingably secured to the under side of the body adjacent but in spaced relation to the rear end thereof.

2. A fishing bait or lure comprising a body having an elongated rearwardly tapered portion, and a forwardly tapered head portion having curved side surfaces merging into the rear portion, and forwardly converging transversely straight top and bottom surfaces bisecting the curved side surfaces of the head portion, the front ends of said top and bottom surfaces being horizontally of substantial width and being vertically spaced providing a horizontally extending nose in the plane of the axial center of the body, said nose having a central recess therein, a line attaching member secured centrally at the bottom of the recess and in substantially the axial center of the body and spaced rearwardly of the end of the nose, said recess being of substantial width and longitudinal depth and height defining a vertical wall to facilitate the flow of a substantial quantity of water vertically therethrough on the opposite sides of a line attached to said attaching member, the portions of the top and bottom converging surfaces on the opposite sides of said recess forwardly of said attaching member extending horizontally a substantial distance from said recess to provide top and bottom surfaces transversely straight and of substantial area at the sides of the recess forwardly of the attaching member, a hook swingably secured to the under side of the body at the rear end of the bottom flattened surface, and a second hook swingably secured to the under side of the body adjacent but in spaced relation to the rear end thereof.

3. A fishing bait or lure comprising a body having an elongated rearwardly tapered portion of circular section, and a forwardly tapered head portion having curved side surfaces merging into the rear portion, and forwardly converging transversely straight longitudinally convexedly outwardly curved top and bottom surfaces bisecting the curved side surfaces of the head portion, the said top and bottom surfaces being of a length approximating the length of the forwardly tapered head portion and terminating in a horizontally extending nose in the plane of the axial center of the body, said nose having a central recess therein and having parallel sides and a vertically rounded bottom, a line attaching member secured centrally at the bottom of the recess and in substantially the axial center of the body and spaced rearwardly of the end of the nose, said recess being of substantial width and longitudinal depth and height defining a vertical wall to facilitate the flow of a substantial quantity of water vertically therethrough on the opposite sides of a line attached to said attaching member, the portions of the top and bottom converging surfaces on the opposite sides of said recess forwardly of said attaching member extending horizontally a substantial distance from said recess to provide top and bottom surfaces transversely straight and of substantial area at the sides of the recess forwardly of the attaching member, and a hook swingably secured to the under side of the body.

4. A fishing bait or lure comprising a body having an elongated rearwardly tapered portion, and a forwardly tapered head portion having side surfaces and forwardly converging top and bottom surfaces bisecting the side surfaces and terminating in a horizontally extending nose, said nose having a recess, a line attaching member secured centrally at the bottom of the recess and in substantially the axial center of the body and spaced rearwardly of the end of the nose, said recess being of substantial width and longitudinal depth and height defining a vertical wall to facilitate the flow of a substantial quantity of water therethrough on the opposite sides of a line attached to said attaching member, and a hook swingably secured to the under side of the body.

5. A fishing bait or lure comprising a body having an elongated rearwardly tapered portion and a forwardly tapered head portion having forwardly converging top and bottom surfaces terminating in a nose portion, said nose portion having a recess opening forwardly thereof and opening vertically through said top and bottom converging surfaces, and a line attaching member secured to the nose portion at the inner end of said recess and spaced rearwardly of the forward end of the nose, said top and bottom converging surfaces converging towards each other for a substantial distance forwardly of said attaching member along the opposite sides of the attaching member, said recess being of substantial width and longitudinal depth and height defining a vertical wall to facilitate the flow of a substantial quantity of water vertically therethrough on the opposite sides of a line attached to said attaching member, the portions of the top and bottom converging surfaces on the opposite sides of said recess forwardly of said attaching member extending substantially horizontally a substantial distance from said recess to provide top and bottom surfaces transversely substantially straight and of substantial area at the sides of the recess forwardly of the attaching member.

JOHN THOMAS McCORMIC.

REFERENCES CITED

The following references are of record in the file of this patent:

UNITED STATES PATENTS

| Number | Name | Date |
|---|---|---|
| 1,239,956 | Phinney | Sept. 11, 1917 |
| 1,616,485 | Carter | Feb. 8, 1927 |
| 1,791,316 | Jordan | Feb. 3, 1931 |